(No Model.)
T. ROGERS.
ADJUSTABLE CRESTING FOR BUILDINGS.
No. 296,458. Patented Apr. 8, 1884.
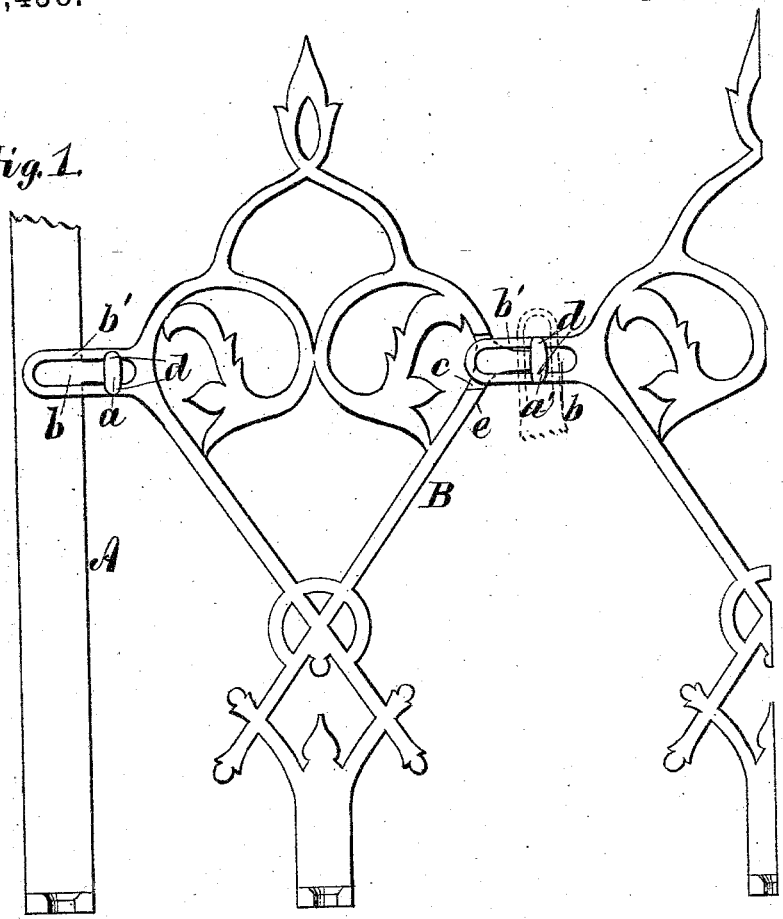
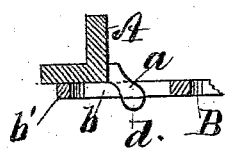
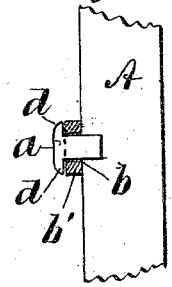
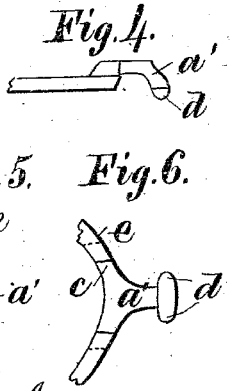
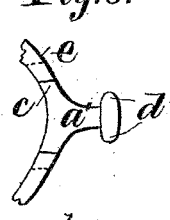
Attest
E. F. Hill
G. W. Gridley
Inventor
Timothy Rogers
Assignor to The Rogers Fence Co.
By B. C. Converse, Atty.

UNITED STATES PATENT OFFICE.

TIMOTHY ROGERS, OF SPRINGFIELD, OHIO, ASSIGNOR TO THE ROGERS FENCE COMPANY, OF SAME PLACE.

ADJUSTABLE CRESTING FOR BUILDINGS.

SPECIFICATION forming part of Letters Patent No. 296,458, dated April 8, 1884.

Application filed March 24, 1883. (No model.)

*To all whom it may concern:*

Be it known that I, TIMOTHY ROGERS, a citizen of the United States, residing at Springfield, in the county of Clark and State of Ohio, have invented certain new and useful Improvements in Adjustable Cresting for Buildings, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in cresting for buildings, verandas, &c.

My invention also relates to improvements in adjustable cresting.

The object of my invention is to dispense with bolts or rivets in connecting the sections or ornaments together, as well as to the finial-posts.

My improvement consists in making the cresting extensible by means which will be hereinafter described.

Figure 1 is a side elevation of a finial-post and connecting-sections attached to the post and to each other. Fig. 2 is a cross-section of the finial-post and its connection with the ornament-section. Fig. 3 is an elevation of a part of the finial-post with its T-shaped hook and the slotted bar of the ornament connected therewith in cross-section. Fig. 4 is a top view of the ornament-bar having the T-shaped hook formed upon it. Fig. 5 is an edge view of that part of the ornament having the hook formed thereon. Fig. 6 is a front view of the same.

In the drawings, A is the finial-post, the shaft of which is right-angled in cross-section. Extending from its right side at the angle is a hook, $a$, which is bent forward and terminates in a T-head. This hook extends through the slot $b$ in the lateral arm or bar $b'$ of the ornament with which it connects. This bar is seen extending to the left against the front side of the finial-post A in Fig. 1. Either a hook or slotted bar may be formed upon the finial-post. On the right of the ornament-section B is a similar adjustment, the hook $a'$ being made on the ornament-frame, and extended the same as from the finial-post.

In a series of connecting ornaments each section is provided with a hook upon one side and a slotted bar upon the other, as seen in the ornament B. In order to bring the connections properly in line with the face of the ornamentation, the frame-bar which has the hook $a'$ thereon is bent back on either side of the hook at right angles, leaving a space, $c$, on either side of the latter sufficient to allow the bar $b'$ to slide therein, and to bring its face in the same line with the main frame of the ornament-section, to which the hook is attached. This gain or bend $c$ in the frame allows alignment of all the ornament-sections on their front sides. The bend $c$ is shown in Figs. 1, 4, 5, and 6. The hooks are lettered $a$ upon the finial-post, and $a'$ on the ornament-section, to distinguish them. In connecting the sections and the finial-post together, the ornament-section to be attached is turned at right angles to the one with which it is to be connected, so that the T-headed hook will pass through the slot $b$. When it is turned back to an erect position, the arms $d$ and $d$ catch over the bar $b'$ on either side of the slot $b$, and the bar slips readily into the space $c$ on either side of the T-head. The manner of making the connection is shown in dotted lines, Fig. 1. By means of the connection the line of ornament-sections can readily be extended or contracted, and thus made to fit any desired space on the building or veranda to which it is applied.

I claim as my invention—

1. In adjustable cresting, an ornament-section having a T-headed hook extending from the frame of the ornament on one side, and adapted to engage with an elongated slot in a frame-bar extending from the frame of the ornament-section connecting therewith, substantially as set forth.

2. An adjustable cresting having its finial-post and ornament-sections each provided at their connecting parts with a T-headed hook and a slotted bar, said hook being formed upon one part of the connection and the slotted bar upon the other, and brought into engagement by turning one of the sections at right angles with the other to allow the hook to pass through the slot in the bar in securing the sections together, substantially as set forth.

3. In combination with the finial-post A, having the bent T-headed hook a, of the ornament-section B, provided with horizontally-slotted bar b', having the slot b, engaging therewith, substantially as set forth.

4. The combination, with the ornament-section, of a frame-bar bent at right angles from its vertical line, so as to form a depression on either side of the hook thereon, to allow the slotted bar on the connecting-section which engages with said hook to lie therein, and to slide endwise under the ends of said hook in adjusting the cresting, substantially as set forth.

In testimony whereof I affix my signature in presence of two witnesses.

TIMOTHY ROGERS.

Witnesses:
B. C. CONVERSE,
G. M. GRIDLEY.